United States Patent [19]
Ansaldi et al.

[11] Patent Number: 5,343,206
[45] Date of Patent: Aug. 30, 1994

[54] METHOD AND MEANS FOR AVOIDING COLLISION BETWEEN A MOTOR VEHICLE AND OBSTACLES

[75] Inventors: Ermanno Ansaldi, Turin; Stefano Re Fiorentin, Grugliasco; Andrea Saroldi, Turin, all of Italy

[73] Assignee: Fiat Auto S.p.A., Turin, Italy

[21] Appl. No.: 1,395

[22] Filed: Jan. 6, 1993

Related U.S. Application Data

[63] Continuation of Ser. No. 725,014, Jul. 3, 1991, abandoned.

[30] Foreign Application Priority Data

Jul. 5, 1990 [IT] Italy .................. 67499-A/90

[51] Int. Cl.$^5$ ............................... G01S 13/93
[52] U.S. Cl. ................... 342/70; 342/72; 342/179
[58] Field of Search ............ 342/70, 71, 72, 176, 342/179

[56] References Cited

U.S. PATENT DOCUMENTS

| | | | |
|---|---|---|---|
| 3,717,873 | 2/1973 | Riggs | 342/42 |
| 4,011,563 | 3/1977 | Robbi | 342/128 |
| 4,072,945 | 2/1978 | Katsumata et al. | 342/70 |
| 4,148,028 | 4/1979 | Fujiki | 342/70 |
| 4,158,841 | 6/1979 | Wüchner et al. | 342/71 |
| 4,165,511 | 8/1979 | Wocher et al. | 342/70 |
| 4,195,425 | 4/1980 | Leitz et al. | 356/28 |
| 4,197,538 | 4/1980 | Stocker | 343/6.5 LC |
| 4,313,115 | 1/1982 | O'Sullivan | 342/41 |
| 4,361,202 | 11/1982 | Minovitch | 342/71 X |
| 4,623,966 | 11/1986 | O'Sullivan | 342/182 X |
| 4,632,543 | 12/1986 | Endo | 356/5 |
| 4,673,937 | 6/1987 | Davis | 342/72 |
| 4,833,469 | 5/1989 | David | 340/901 |
| 4,926,171 | 5/1990 | Kelley | 340/961 |
| 4,970,653 | 11/1990 | Kenue | 364/461 |
| 5,068,654 | 11/1991 | Husher | 340/903 |
| 5,081,585 | 1/1992 | Kurami et al. | 364/424.02 |
| 5,122,957 | 6/1992 | Hattori | 364/424.02 |
| 5,128,874 | 7/1992 | Bhanu et al. | 364/461 |
| 5,140,532 | 8/1992 | Beckwith, Jr. et al. | 395/101 |
| 5,208,750 | 5/1993 | Kurami et al. | 364/424.02 |
| 5,249,126 | 9/1993 | Hattori | 364/424.02 |

FOREIGN PATENT DOCUMENTS 353200  1/1990  European Pat. Off. .

*Primary Examiner*—John B. Sotomayor
*Attorney, Agent, or Firm*—Ladas & Parry

[57] ABSTRACT

The method for avoiding collision between a motor vehicle and obstacles placed in the path of the vehicle comprises the stages of forming a radar map of the area in front of the vehicle, reconstructing the geometry of the road, identifying its edges, detecting the position and speed of the vehicle with respect to the road, determining the presumed path of the vehicle on the basis of the road geometry and the manoeuvre being carried out by the vehicle at that instant, detecting objects on the radar map found lying in the presumed path of the motor vehicle and displaying the map found in a perspective representation, ignoring objects which are off the road and indicating objects in the path of the vehicle in a different manner according to their hazard and if appropriate generating alarms of an acoustic type.

22 Claims, 7 Drawing Sheets

METHOD AND MEANS FOR AVOIDING COLLISION BETWEEN A MOTOR VEHICLE AND OBSTACLES

This is a continuation of copending application Ser. No. 07/725,014 filed on Jul. 3, 1991 now abandoned.

BACKGROUND OF THE INVENTION

This invention relates to a method and means for avoiding collision between a driven motor vehicle and obstacles lying in its path.

It is known that a high percentage of accidents could be avoided by anticipated reaction by the driver. As a consequence various anti-collision systems designed to monitor the environment surrounding the motor vehicle and to indicate the presence of obstacles to the driver, in particular under conditions of poor or reduced visibility, typically as a result of fog, but also as a result of lack of attention by the driver, have already been investigated and proposed for a number of years.

In particular various systems, either of the passive type, such as television cameras, which however have the disadvantage that they require complex computing for the determination of distance, and of the active optical type, such as laser devices, which are however subject to atmospheric absorption, in particular in fog, and above all microwave radar, which has better properties than the other systems in that it provides the distance to the objects found directly, with barely any atmospheric absorption, have been proposed for the detection of obstacles.

The simplest known arrangements are of the fixed beam type with straight-line observation of the area of the road in front of the vehicle. These arrangements have proved to be of little reliability and are subject to numerous errors, particularly on bends, because of the inability of the system to distinguish obstacles which actually lie in the vehicle's path from objects which lie in a straight line in front of the vehicle but not in its path, such as trees growing by the edge of the road on a bend or vehicles travelling in the opposite direction (as is for example shown in FIG. 1, in which a vehicle 1 travelling in direction 2 on a section of road 3 mounting a fixed beam system would see vehicle 5 travelling on section of road 6 on the opposite carriageway and in direction 7 as an obstacle).

In order to overcome the problems mentioned above, other known arrangements provide for the possibility of orientating the beam on the basis of the angle of the steering wheel and others also provide for the scanning of circular sectors ahead of the vehicle on the basis of the steering wheel angle. However even these arrangements yield a high number of false alarms, as again made clear in the example in FIG. 1. In fact, as is known, when vehicle 1 explores the area of road which extends along a line of circumference indicated by dashed line 8 corresponding to the manoeuvre initially brought about by means of the steering wheel, objects which are placed at the edge of the road at the point indicated by 9, or right off the road, are identified as obstacles, when in fact there is no obstacle in the real path of the vehicle indicated by dashed line 10.

In an attempt to eliminate these disadvantages special arrangements, such as the use of complex filters based on the relative speed of an obstacle in such a way as to delay the alarm and permit further observation, which only solve part of the problem of false alarms and do not offer a sufficient level of reliability, have been investigated.

Known systems also provide various arrangements for attracting the driver's attention to the alarm situation detected, using displays which in general provide for the illumination of predetermined luminous icons of different colour and size depending on the level of the alarm, accompanied by signals of an acoustic type. However even these known types of display have proved to be insufficiently effective and also restricted, in that they do not provide information on the transverse dimensions and position of the obstacle with respect to the road, and therefore on the scope for avoiding the obstacle by means of a suitable manoeuvre.

SUMMARY OF THE INVENTION

The object of this invention is to provide a method and means which overcome the disadvantages of known arrangements, reducing false alarms to a minimum and allowing effective display of the road situation.

According to this invention a method is provided for avoiding collision between a driven motor vehicle and at least one obstacle or object. The method includes the stages of: detecting possible obstacles in an area in front of the motor vehicle on the basis of the presumed path of the vehicle, calculating the distance and the relative speed of the obstacles found, and indicating the obstacles found with an indication of their hazard level, the said stages being repeated cyclicly, characterised in that the said stage of detecting possible obstacles comprises the stages of generating a map of the environment in front of the vehicle by means of scanning the said environment, reconstructing the geometry of the road on the basis of this map, reconstructing the presumed path of the vehicle on the basis of the road geometry and detecting any obstacles within the presumed path.

This invention also relates to a system for avoiding collision between a driven motor vehicle and at least one obstacle or object, comprising a sensor capable of monitoring an area in front of the vehicle in order to detect the presence of objects, means for calculating the distance and relative speed of the objects found, and means for signalling the presence of objects found, indicating their hazard level, characterised in that the said sensor is a scanning sensor capable of generating a map of the environment in front of the motor vehicle, and in that it comprises means capable of reconstructing the geometry of the road on the basis of the said map, means for reconstructing the presumed path of the vehicle on the basis of the road geometry and means for detecting any obstacles within the presumed path.

BRIEF DESCRIPTION OF THE DRAWINGS

In order to provide a better understanding of this invention a preferred embodiment will now be described purely by way of a non restrictive example with reference to the appended drawing, in which.

DETAILED DESCRIPTION OF THE INVENTION

Figure 1:
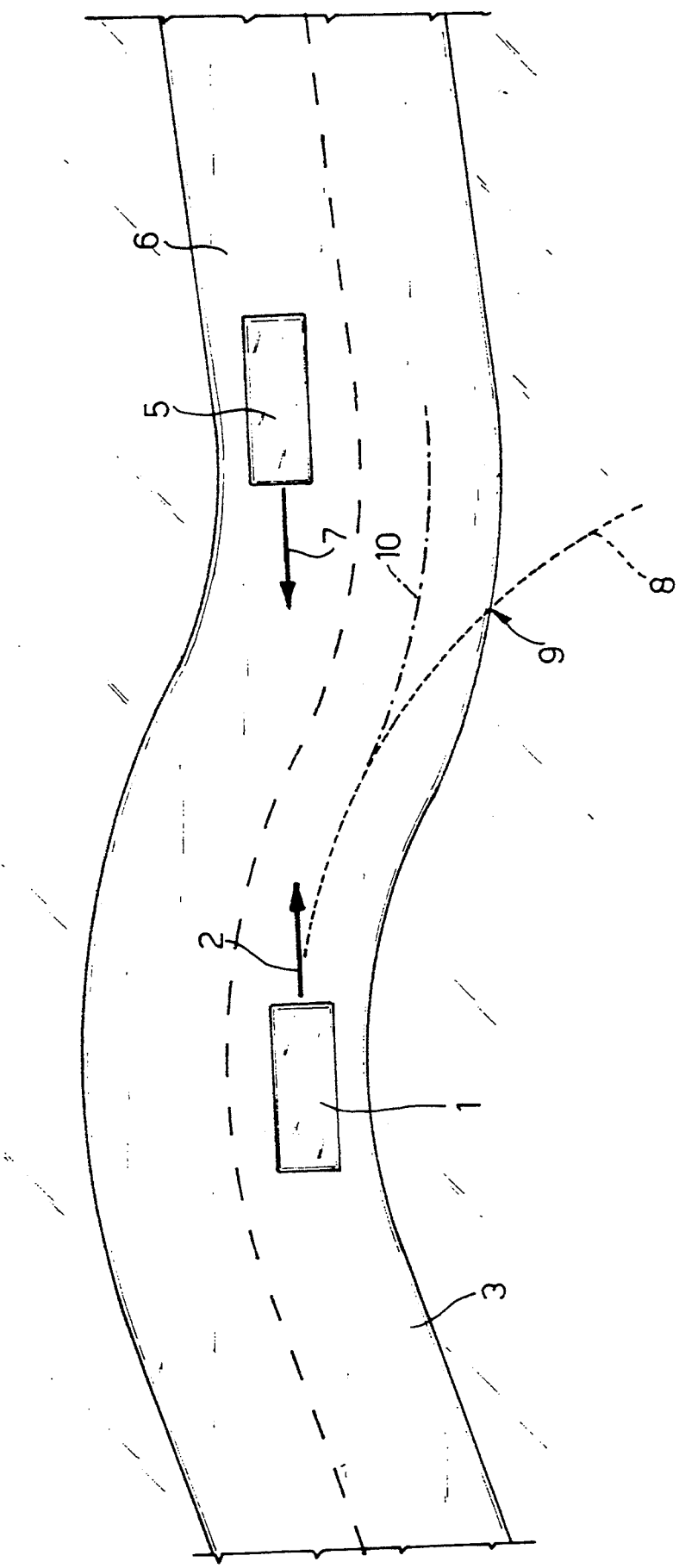
FIG. 1 is a plan view of a section of road being travelled by a vehicle.

With reference to FIG. 1, in order to avoid as many false alarms as possible the method according to the invention provides for the reconstruction, for a vehicle 1 on a stretch of road 3, of a path 10 which on the one hand can be physically followed by the vehicle itself and on the other hand is plausible in the specific situation, i.e. it takes into account the geometry of the road and the manoeuvre imposed by the vehicle itself. In order to reconstruct this path this method provides for acquisition of a map of the road situation so as to detect objects placed at the side of the road whereby the edges of the road can be determined; also any obstacles which may be present and the position of the vehicle with respect to the road are detected and data on the speed and angle of turn of the vehicle are obtained. In order to reconstruct the presumed path this method is based on the assumption that with the lack of evidence to the contrary the vehicle will tend to follow the flow of traffic, i.e. will tend to keep to a path parallel to the line of the road. Three different levels of approximation to the path are provided in order to take account of different possible situations and the data available from time to time.

With this object the path is reconstructed on the assumption that every road consists of a series of sections which may be either straight, or curved or forming a junction and each section is described using the geometrical model of the Cornu spiral, according to which every path is represented by three parameters corresponding to the width, the instantaneous curvature $C_0$ and its spatial derivative $C_1 = dC_0/dl$. As a consequence straight sections are described by the values $C_0 = 0$ and $C_1 = 0$, curves by the values $C_0 = 1/R$ (where R = the radius of curvature of the curve) and $C_1 = 0$, and junctions are distinguished by a value of $C_1$ which is not 0. Given these assumptions the lowest level of approximation consists of determining the path on the basis of the position of the steering wheel and in this case $C_0$ is equal to the curve set via the steering wheel and $C_1$ is equal to 0. A greater level of approximation consists of assuming that the path of the vehicle will be maintained parallel to the direction of the road and therefore requires an understanding of the geometry of the road itself in order that the curvature of the road and the curvature of its spatial derivative within a predetermined distance can be calculated. A third level of approximation is obtained by attempting to understand the manoeuvre performed by the vehicle, in particular when it is found that the axis of the vehicle forms an angle which is not zero with respect to the direction of the road, to understand whether this deviation represents a non-significant fluctuation or is due to a special manoeuvre by the driver. The third level is therefore designed to eliminate false alarms due to small fluctuations in the direction of the vehicle as it travels, instead providing correct indications in the case of manoeuvres which do not follow the line of the road, such as when overtaking or when entering a side road.

The use of different levels of approximation when reconstructing the presumed path thus makes it possible to describe the situation with greater accuracy, providing a more correct forecast when the data available permit it, and nevertheless ensuring a description of the situation which can be used for the detection of obstacles, with a lesser level of likelihood, when it is not possible to reconstruct an effective "plausible" path. This means for example that when it is not possible to reconstruct the geometry of the road owing to the lack of reference points (such as a guard rail or crash barrier) the path is reconstructed with the lesser degree of approximation.

According to this method the determination of a presumed path on the basis of the specific situation, with a greater or lesser likelihood, as indicated, makes it possible to determine a travel corridor which has as its width the width of the vehicle and the radar map found is therefore "reshaped" on the basis of the travel corridor obtained in order to check whether any objects have been found within it. These objects represent true obstacles, unlike other objects found by the radar map which lie outside the travel corridor and if the vehicle continues on its path will not lie in its path. Continuous updating of the situation, with determination of the map at a predetermined frequency and corresponding reconstruction of the presumed path makes it possible to follow changes in the path of the vehicle itself.

Once the path has been reconstructed and the obstacles lying in it have been identified the "hazard level" of these obstacles is evaluated, taking into account the safe distance (which depends on the speed of the vehicle, the maximum deceleration which can be achieved by braking and the reaction time of the driver/vehicle system) and the relative speed of the obstacles. A forecast representation of the road situation in front of the vehicle is then provided showing potentially hazardous obstacles, and a signal which may also be of an acoustic type is provided. Real time display of the situation, with continuous updating, therefore enables the driver to keep the road situation continuously in view and to adjust his behaviour correspondingly.

Figure 2:
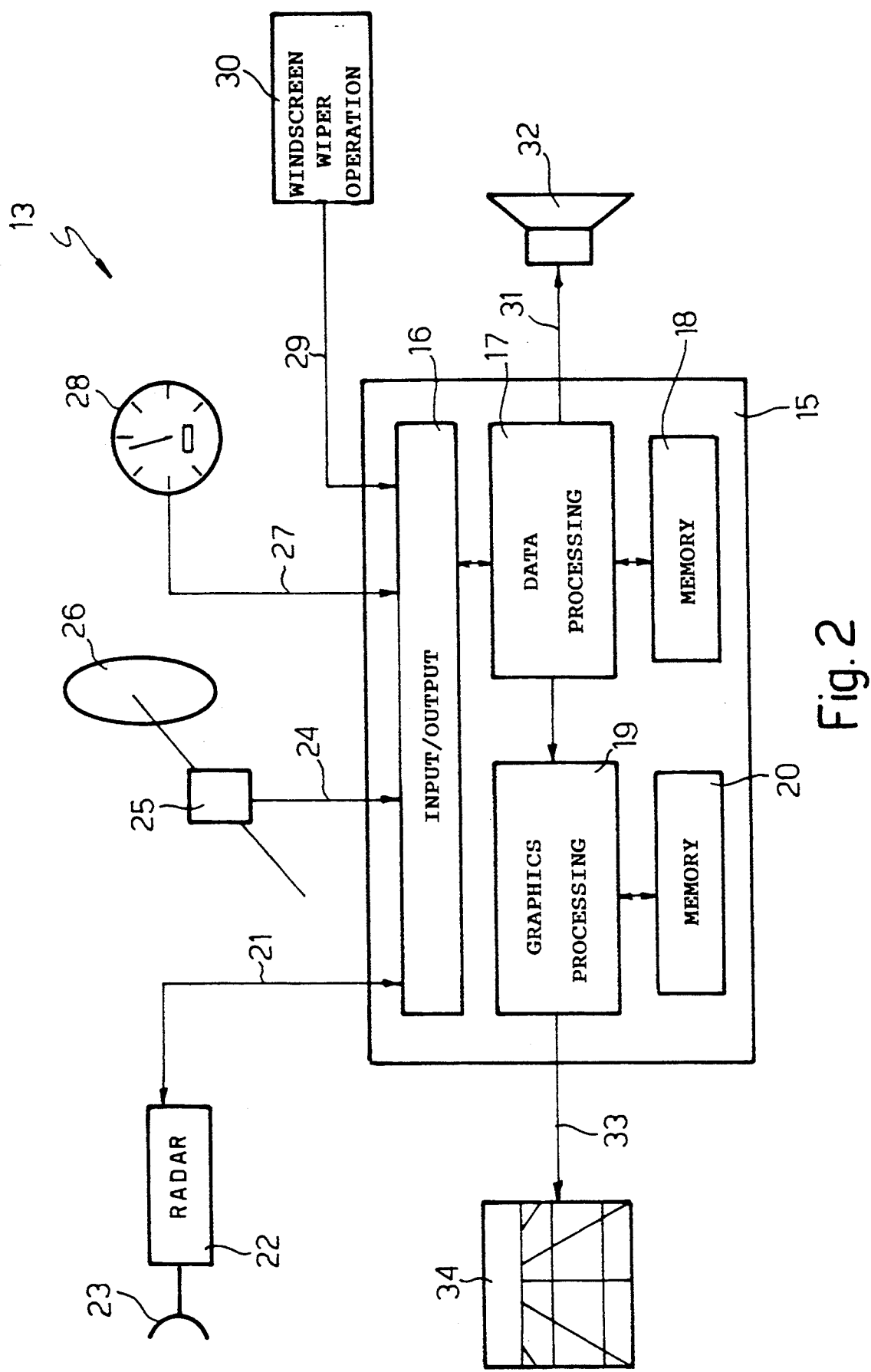
FIG. 2 is a block diagram of the means according to this invention.
Figure 6:
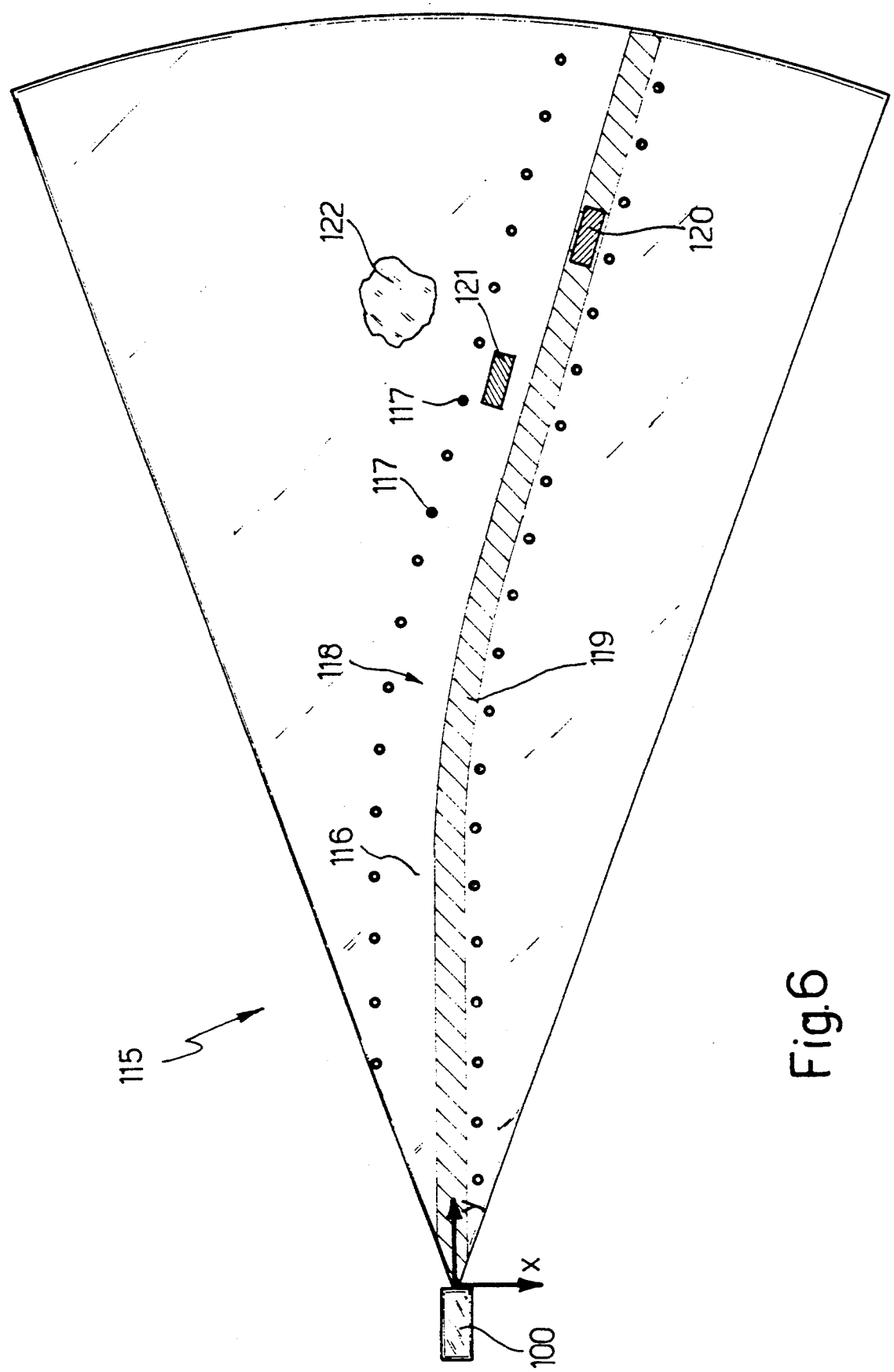
FIG. 6 shows a radar map which can be obtained with the anticollision means and method in FIGS. 2 and 3.

With reference to FIG. 2, the means for implementing the method for detecting obstacles and their display in the manner described above is indicated as a whole by 13 and is intended to be mounted on a motor vehicle (indicated by 100 in FIG. 6). Means 13 includes a central unit 15 for data processing, reconstruction of the path and graphic computation of the road situation, a plurality of sensors for detecting the parameters required for the computation and display, and acoustic devices to represent the road situation and signal alarm situations.

In details central unit 15 includes: an input/output unit 16, a data processing unit 17 connected to input/output unit 16, a data memory 18 connected to data processing unit 17, a graphics computing unit 19 connected to data processing unit 17, and a graphics data memory unit 20 connected to the corresponding graphics computing unit 19. Input/output unit 16 of central unit 15 is connected by a two directional line 21 to a scanning radar 22 equipped with an antenna 23 and is capable of generating a radar map of the portion of space lying in front of the vehicle; it is also connected by a one-way line 24 to a sensor 25 detecting the angle of steering wheel 26 of the vehicle on which means 13 is mounted, and by a one-way line 27 to the vehicle's speedometer 28 and by a one-way line 29 to a sensor 30 which detects whether the windscreen wipers are in operation. In an embodiment of means 13 which has provided satisfactory results radar 22 has a horizontal scanning angle of approximately 40° centred along the axis of the vehicle and divided into a plurality of sectors 5 and an elevation of 5°–6° which offers both a good view of the scene with the object of evaluating required behaviour even when on an incline or bumps and also does not excessively load the system with useless (or downright misleading) data for the purpose of the recognition of obstacles, in particular objects which are off the road or above it (bridges and suspended signals). In a known way, on the basis of the time for the receipt of return echos due to reflection of the radar pulses by obstacles, radar 22 calculates the distance of the obstacles and generates a radar map, i.e. a matrix within which the echos detected are stored on the basis of the map sector (scanning angle) and the distance found. This map is provided together with the steering angle detected by sensor 25, and the speed of the vehicle provided by speedometer 28, and the state (wet or dry) of the road surface (detected in the case of the embodiments illustrated by sensor 30), to central unit 15 which processes the data received, as will be seen later on the basis of FIGS. 3 to 7, and generates a perspective representation of the scene in front of the vehicle for the purposes of displaying and detecting obstacles, and also controls various acoustic alarm signals.

With this object data processing unit 17 of central unit 15 is connected via one way line 31 to an acoustic warning device 32 and graphics computing unit 19 is connected via a one way line 33 to a graphics display unit 34, for example a liquid crystal display.

Figure 3A:
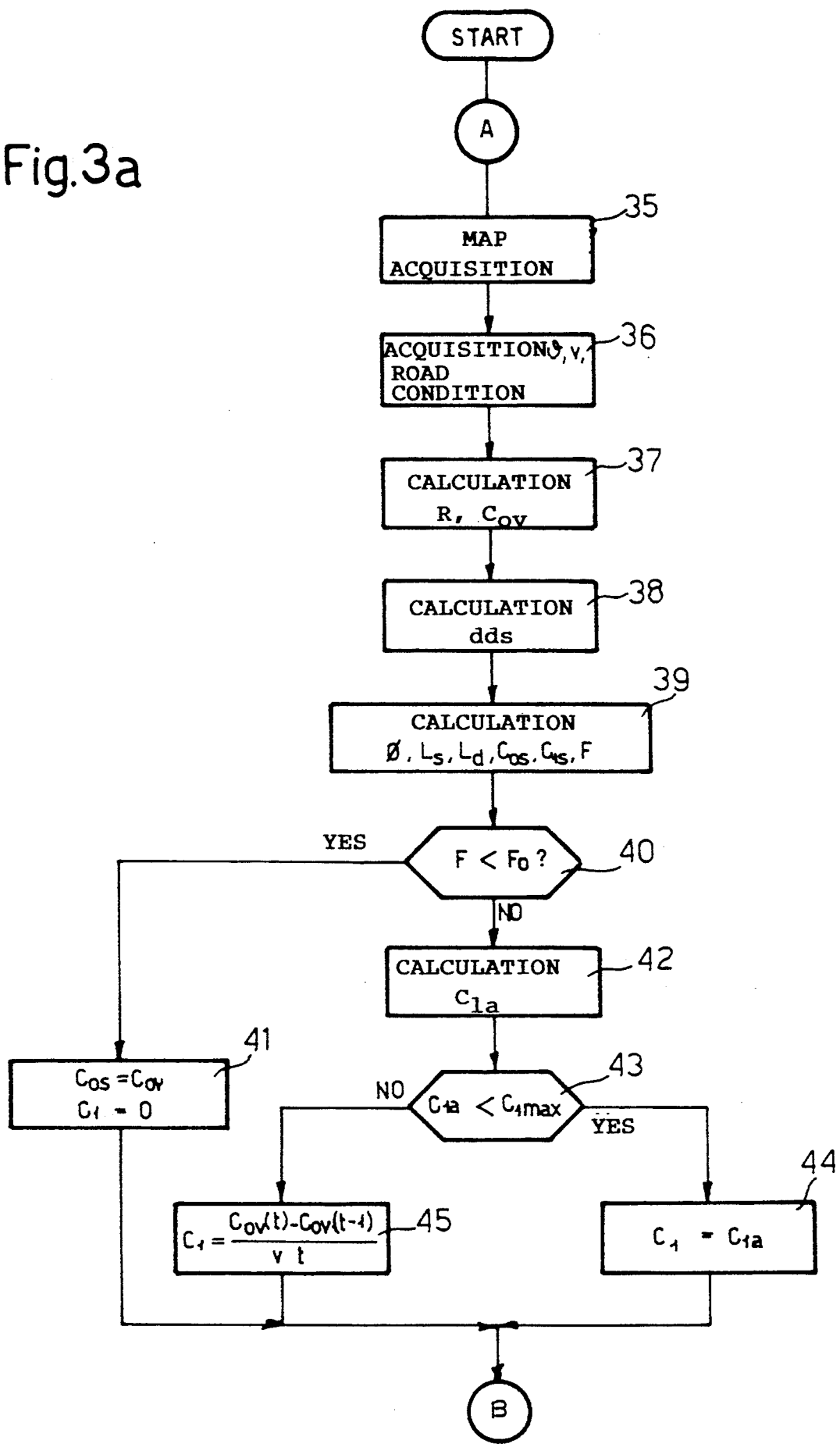
FIG. 3 is a flow chart of the method used by the means in FIG. 2.
Figure 3B:
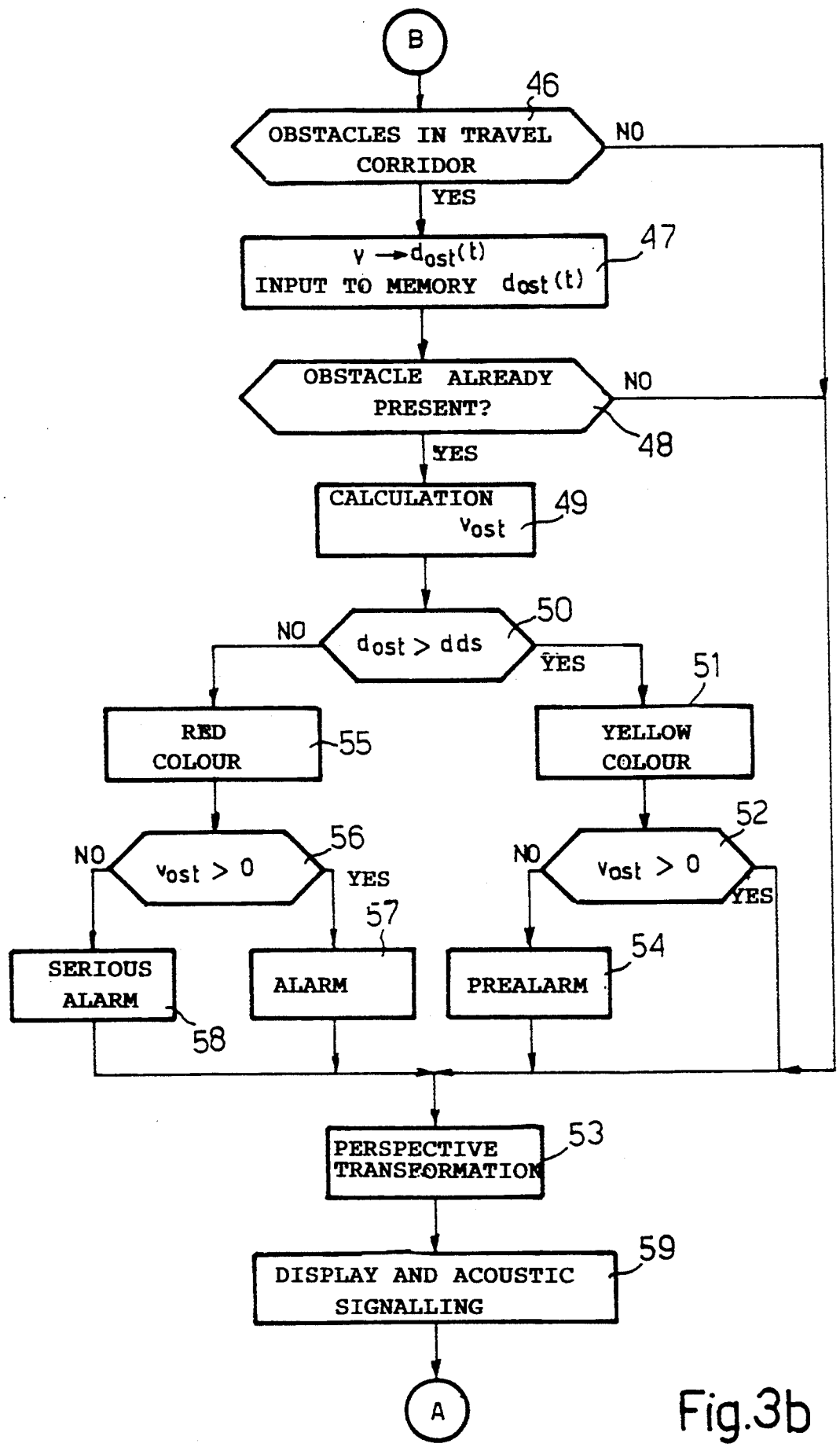
Figure 4:
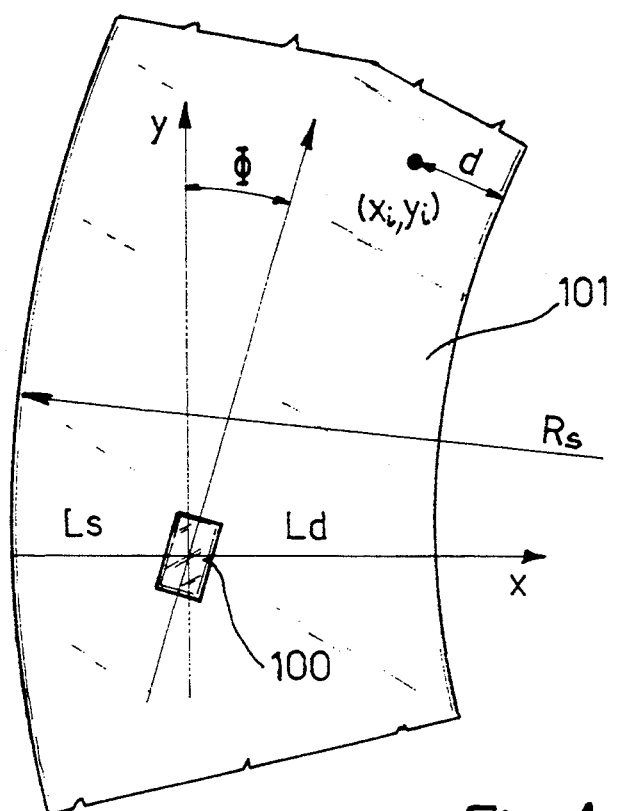
FIGS. 4 and 5 are two plan views of curved sections of road being travelled by a motor vehicle.

A preferred embodiment of the means for avoiding collisions will now be described with reference to FIG. 3, showing the sequence of stages repeated at a predetermined frequency in order to provide a continual update of the detection and display of obstacles on the basis of the actual situation. To begin with radar 22 constructs the radar map, as previously described, and passes it by line 21 to central unit 15 (map input block 35). At this stage data processing unit 17 filters the detection data obtained, in particular by means of an alpha-beta filter of a known type (see for example: Kalata. The Tracking Index: A generalised parameter for alpha-beta and alpha-beta-gamma target trackers, IEEE Transactions on Aerospace and Electronic Systems, vol. 20, No. 2, March 1984). Then data processing unit 17 obtains data relating to the steering wheel steering angle $\theta$, the velocity V of the vehicle and the condition of the road surface as provided by lines 24, 27 and 29 (block 36). Then the radius of curvature $R_V$ of the path travelled by the vehicle at that instant is read from the angle of the steering wheel, using a suitable table stored in data memory 18 and the curvature $C_{0V}$ of this path is then calculated (from the equation $C_{0V}=1/R_V$, block 37). Preferably the speed of the vehicle V and its curvature $C_{0V}$ are filtered using a alpha-beta filter so as to satisfy the physical assumption of continuity. The data obtained in this way, which can be gathered under any conditions because they are directly measurable, provide a first approximation to the presumed path on the basis of the current situation, thus providing a minimum hypothesis which in most cases will not correspond to the actual path travelled by the vehicle, but nevertheless generally an acceptable working hypothesis when it is not possible to reconstruct the geometry of the road, as will be explained below.

Data processing unit 17 then calculates (block 38) the safe distance using the equation:

$$dds = v^*Tr + v^2/(2^*A_{max})$$

in which Tr represents the reaction time of the vehicle/driver system and is a fixed value, for example 1 second, corresponding to a mean value determined on the basis of specific investigations, and $A_{max}$ represents the maximum deceleration produced by hard braking and depends on speed and road conditions. This latter parameter $A_{max}$ (which corresponds to the maximum deceleration and is also governed by regulations) is generally read from a suitable table stored in data memory 18, on the basis of the vehicle speed v and the road surface conditions found.

The central unit then attempts to reconstruct the geometry of the road in a reference system centred on the vehicle, calculating its five characteristic parameters (block 39). In fact, with reference to FIG. 4, with respect to a vehicle 100 travelling on a section of road 101 representing the origin of a system of cartesian axes x,y, the road can be described by the parameters $\Phi$, $L_s$, $L_d$, $C_{0s}$ and $C_{1s}$, where $\Phi$ represents the "heading angle", i.e. the angle formed between the axis of vehicle 100 and the direction of the road, $L_s$ and $L_d$ are the distances from the left hand side and the right hand side of the road respectively to the centre of the vehicle and $C_{0s}$ and $C_{1s}$ define the shape of the road on the basis of the Cornu spiral model, according to which the curvature C (which is the inverse of the radius $R_s$, i.e. $C=1/R_s$) is given by $$C = C_{0s} + C_{1s}^*1$$

where l=the length of the section of road in question.

On the assumption that the edge of the road can be recognised by the presence of reflecting objects which can be identified by the radar, such as crash barriers, guard rails or trees, and $x_i$, $y_i$ are the coordinates of the $i_{th}$ point detected by radar scanning, the algorithm used by this method finds the values of the parameters $\Phi$, $L_s$, $L_d$, $C_{0s}$ and $C_{1s}$ which maximise the function $$F = \Sigma_i \frac{1}{1 + a^* d^2(\phi, L_s, L_d, C_{0s}, C_{1s}; x_i, y_i)}$$

where i=1 . . . n, where n is equal to the number of points detected by the radar scanning and d is the geometrical distance between the point having coordinates ($x_i$, $y_i$) and the edge of the road, identified by means of the above five parameters.

This method in practice searches for the road parameters best approximating to the reflectors present at the edges of the road.

On the basis of this method it is assumed that the values of the five parameters effectively define the edge of the road if the function F is greater than a predetermined minimum threshold value $F_0$, and as a consequence the next pass (block 40) consists of verifying this condition. In particular, if function F has a value lower than predetermined threshold $F_0$ it is considered that the road is not recognised (lack of a sufficient number of objects on the edge of the road), and the road is approximated on the basis of the simplest level of interpolation, which is obtained, as has been said, from the position of the steering wheel. In this case therefore (block 41) $C_{0s}=C_{0V}$ and $C_1=0$.

If this is not the case it is assumed that the values of the parameters found in fact describe the geometry of the road. These parameters can be used to reconstruct a "plausible" path on the assumption that the vehicle remains parallel to the edges of the road, and therefore provide a better approximation to the path itself, even though they do not take into account the fact that there are generally fluctuations in the direction of travel while in motion or that the driver may perform a special manoeuvre. In this case therefore a path reconstructed on these assumptions will not be a true path and cannot be used to detect potential obstacles.

In accordance with this method therefore an attempt is made to establish whether a manoeuvre aligning the vehicle and the road is in progress, evaluating whether this alignment would involve a greater or a lesser manoeuvre and as a consequence reconstructing the path within which possible obstacles which have to be indicated to the driver should be sought. In fact the safe area within which potentially hazardous obstacles have to be sought extends not only in depth (safe distance), but also in width, the latter being determined by manoeuvrability, i.e. the possibility of performing "minor" manoeuvres corresponding to small changes in the angle of the steering wheel. Changes in the steering wheel angle affect the possibility of computing different paths within a band called the manoeuvrability zone; this zone is wide at low speeds and narrow at high speeds.

Figure 5:
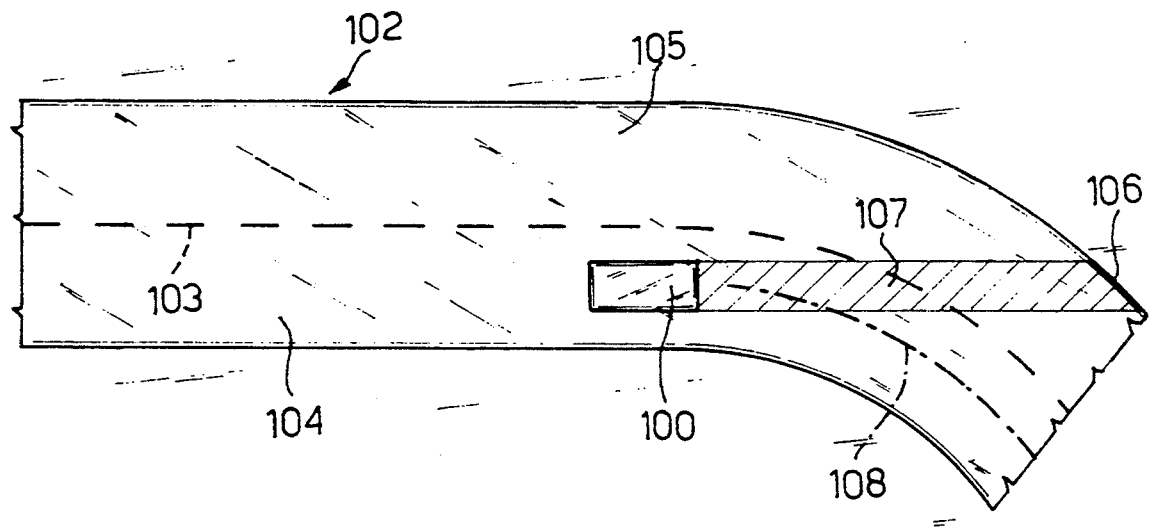

For a better understanding of this problem a special case will now be illustrated with reference to FIG. 5. Here a vehicle 100 is travelling on a section of road 102 divided by an intermediate dashed line 103 into two carriageways 104 and 105. Vehicle 100, which lies on carriageway 104, may find the crash barrier (detected in this area as thick line 106) to be an obstacle if its path is not suitably corrected. In particular the magnitude of the hazard situation is linked with the speed of the vehicle, which in the case of high speed is constrained to make a sharp manoeuvre in order to avoid the obstacle, whereas at low speed it can change the direction of movement less brusquely without a risk of collision. The path must therefore be reconstructed making a distinction between the two possibilities (in the first case in fact the estimated travel corridor within which possible obstacles have to be sought will be that shown by dashed portion 107 in the figure, while in the second case reconstruction of the path will result in the path indicated by dotted and dashed line 108).

In order to understand the manoeuvre being performed by the vehicle, according to this method the spatial derivative of the curvature $C_{1a}$ which is necessary to return the vehicle to a direction axial with the road at a predetermined distance D associated with the speed of the vehicle is calculated in block 42 (this distance is read from a suitable table stored in data memory 18). In particular $C_{1a}$ is obtained in the following way.

In the system of reference with respect to the vehicle the angle of the road axis $\alpha(1)$ changes in accordance with the relationship:

$$\alpha(1) = \Phi + C_{0s}*1 + C_{1s}*1^2/2$$

while the angle of the axis of the vehicle $\beta(1)$ varies according to the relationship:

$$\beta(1) = C_{0V}*1 + C_{1V}*1^2/2$$

The "heading angle" $\Phi(1)$ varies in accordance with a relationship resulting from the difference between the angle of the axis of the road and the angle of the axis of the vehicle, i.e.:

$$\Phi(1) = \Phi + (C_{0s} - C_{0V})*1 + (C_{1s} - C_{1V})*1^2/2$$

Calculation of the aligning manoeuvre returns the "heading angle" $\Phi$ to zero at distance D. Substituting $\Phi(0D) = 0$ we obtain:

$$C_{1a} = C_{1V} = C_{1s} + 2*(C_{0s} - C_{0V})/D - 2*\Phi/D^2$$

Having obtained $C_{1a}$, i.e. the manoeuvre required to bring the axis of the vehicle in line with the axis of the road at distance D, this value is then compared (block 43) with a threshold value $C_{1amax}$ (determined experimentally and also stored in memory 18) which can be used to distinguish whether the manoeuvre which has to be performed is slight or sharp. In particular, if it is found that $|C_{1a}| < C_{1amax}$ this means that the manoeuvre required is of the "slight" type, and it is then very likely that the inclination of the vehicle with respect to the road is due to a fluctuation, and then $C_1 = C_{1a}$, i.e. the change in the curvature of the estimated path will be equal to the "slight" manoeuvre which has to be performed (block 44). Vice versa, if the condition established by block 43 is not satisfied (NO output therefrom) the value of $C_1$ resulting from the manoeuvre actually being performed by the vehicle (block 45) is calculated using the equation:

$$C_1 = \frac{C_{0V}(t) - C_{0V}(t-1)}{v*t}$$

where $C_{0V}(t)$ represents the derivative of the curvature of the vehicle which has just been calculated (by means of block 37), $C_{0V}(t-1)$ represents the same derivative calculated in the previous iteration and t represents the time interval between this iteration and the previous one.

Once the parameters of the assumed path, which according to the data available may approximate to a greater or lesser extent to the actual path of the vehicle, have been found, the radar map, as acquired via block 35, is reshaped on the basis of the shape of the travel corridor centred on the foreseen path which has just been constructed, which has a width equal to that of the vehicle, and a check is made to see whether there are any obstacles within this corridor (block 46). For example if radar 22 provides a radar map such as that illustrated in FIG. 6 and indicated by reference 115 (in this particular instance the road, indicated by 116, is bounded by a set of crash barriers 117 and has a bend 118 a little in front of vehicle 100 in its direction of travel), the calculated travel corridor 119, represented by dashed lines, follows the road profile and intercepts another vehicle 120 which is travelling in the same direction as vehicle 100 after bend 118, while vehicle 121 travelling on the opposite carriageway and tree 122 which is off the road lie outside corridor 119 and are therefore not identified as obstacles, as also crash barriers 117, which are used to reconstruct the geometry of the road and therefore travel corridor 119.

If no obstacles are identified within the travel corridor the method provides for a representation of the road situation as reconstructed on the basis of the data available, as will be seen below (and the NO output from block 46 therefore passes to block 53), while on the other hand if obstacles are identified, as in the case illustrated in FIG. 6, (YES' output from block 46) this method provides for an evaluation of the "hazard level" of the obstacle. For this purpose, and for every obstacle found, its y coordinate in the reference system with respect to the vehicle (i.e. its distance from the vehicle itself) is stored in memory as $d_{obst}(t)$ in a suitable matrix (block 47). Then, for every obstacle, a check is made to see whether obstacles were identified within the travel corridor (block 48) in the previous map. For this purpose a search is made among the obstacles stored in memory in the previous iteration to see if there is one whose distance is slightly different from the distance of the obstacle being considered at that instant (taking into account if appropriate other parameters such as the width dimension of the obstacle, which provides a more reliable association between identifications of the same obstacle in successive maps).

If the obstacle in question was not present on the previous map (NO output from block 48) the system proceeds directly to processing the representation of the road situation (block 53), otherwise (YES' output) the relative speed of the obstacle is calculated using the formula:

$$V_{obst} = \frac{d_{obst}(t) - d_{obst}(t-1)}{t}$$

(block 49). Then (block 50) a check is made to establish whether the distance of the obstacle found is greater or less than the safe distance dds calculated in block 38. If it is greater (YES' output from block 50) data processing unit 17 instructs graphics processing unit 19 to prepare a representation of the object in yellow (block 51) and then checks (block 52) whether the relative speed of the obstacles $V_{obst}$ is positive or not, in order to determine whether the object is moving away from the vehicle mounting anticollision means 13 or approaching it. In the first case ($V_{obst} > 0$), i.e. when the obstacle is moving away, no special alarm is generated and the system proceeds directly to process the perspective graphical representation of the road situation (block 53), while if the relative velocity of the obstacle is zero or negative, i.e. when the obstacle keeps the same distance from the vehicle provided with means 13 or approaches it (no output from block 52) the acoustic warning device is activated so that it generates an acoustic signal characteristic of a prealarm condition (block 54). The graphic processing process for representing the situation (block 53) is then initiated.

If instead the output from block 50 is negative, i.e. if the obstacle is within the safe distance, data processing unit 17 instructs graphics processing unit 19 to represent the object in red (block 55) and then checks (block 56) whether the relative speed of the obstacles $v_{obst}$ is positive or not. In the first case, which also corresponds in this case to the situation where the obstacle is moving away from the vehicle, acoustic warning 32 is activated to produce an acoustic signal indicating an alarm condition (block 57), while in the second case (obstacle approaching) acoustic warning 32 is activated to produce an acoustic signal indicating a serious alarm condition (block 58).

In both cases, graphics processing unit 19 at this point processes the data previously obtained to generate a perspective image of the situation. In detail (block 53) a transformation is effected so as to convert the radar-generated representation based on angle and distance (and corresponding to a plan view of the area in front of the vehicle) into a perspective view.

In particular, the transformation which links the position (x, y) of objects on the radar map with that ($x_p$, $y_p$) in the perspective view is given by the laws of perspective and can be expressed, ignoring scale factors, by the following equations:

$$x_p = x/y$$

$$y_p = l/y$$

The objects can then be associated with a height which decreases with distance so as to give depth in accordance with the relationship:

$$h = l/y$$

In accordance with this method the background is provided in the form of a rectangular grid to provide an idea of depth, the edges of the road are indicated by means of short lines, objects on the road which do not lie within the travel corridor are shown, and objects lying within the travel corridor are coloured yellow or red in the manner described above.

Figure 7:
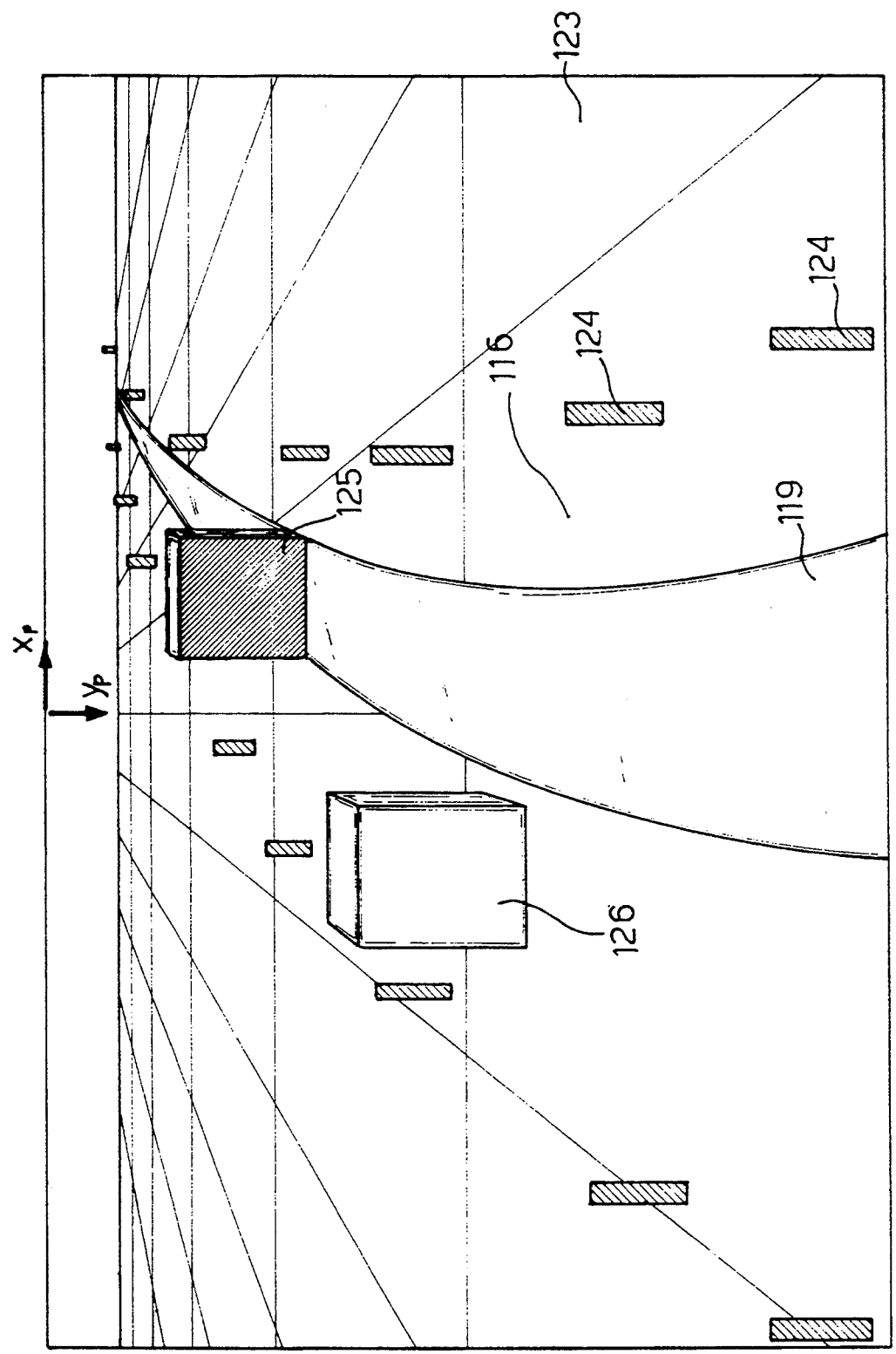
FIG. 7 shows a representation of the road environment in front of a vehicle obtained using the means and method in FIGS. 2 and 3.

Graphics processing unit 19 therefore controls display 34 (block 59) so that this displays the image produced; a representation of the type shown in FIG. 7 of the radar map in FIG. 6 is therefore obtained. In FIG. 7 therefore the rectangular grid background is indicated by 123, tree 122 is not shown, being off the road, short lines 124 represent the edge of road 116 and in general do not coincide with crash barriers 117 in FIG. 6, vehicle 120, which can be seen in FIG. 6 and is located within travel corridor 119, is represented by a rectangular block 125 and rectangular block 126 represents vehicle 121 which can be seen in FIG. 6 and is travelling on the opposite carriageway, and is therefore outside travel corridor 119. As explained above rectangular block 125 which represents a possible obstacle will be coloured red or yellow depending on its distance from the vehicle carrying the anticollision means, while rectangular block 126 will only be shown as its external profile without special colouring.

Having completed these stages the method provides for the acquisition of a new map and its processing as described above in order to update the display on the basis of changes in the road situation, thus always keeping the driver in a state such that he can evaluate as precisely as possible what manoeuvre is most desirable.

The advantages which can be obtained with the means and methods described above are as follows. Through reconstruction of the estimated path of the vehicle at a level of approximation which depends on the data available it is possible to search for obstacles within the area which probably will (or might) be occupied by the vehicle in the course of its travel, thus making it possible to eliminate virtually all or almost all false alarms which in known arrangements are due to insufficient understanding of the situation. The reduction in false alarms is also due to the fact that the assumptions introduced are based on physical characteristics of the world under investigation and, in particular, the laws of the physical world act as constraints on permitted configurations (for example only manoeuvres which can physically be performed by the vehicle are considered when calculating its path).

In detail, investigation of the manoeuvre required in order to get back into line with the road profile in the stages described in block 42 and 43 makes it possible to eliminate false alarms even when moving in a straight line, when small correcting manoeuvres such as those which are normally performed during driving are performed, and which, if only the angle of the steering wheel were to be considered, might cause vehicle paths which intercept the edge of the road or adjacent carriageways to be considered. Similarly, when travelling along the central part of a bend with a constant radius of curvature, through investigation of the manoeuvre the basic information provided by the angle of the steering wheel can be corrected in order to hold the vehicle's path substantially along the road profile. Also, when approaching a bend or leaving one, information from the angle of the steering wheel alone could give rise to false alarms due to objects at the side of the road, given that the curve set by the steering wheel is not a valid prediction of the path, whereas by foreseeing a manoeuvre which would maintain the vehicle's path along the axis of the road it is possible to search for obstacles in a much more realistic way. However if the speed of the vehicle is too high the path which would cause the vehicle to follow the curve moves outside the limits of manoeuvrability, and as a result of the discrimination which can be made by block 43 is not considered. In this case, as already explained in a similar way with reference to FIG. 5, the objects alongside the road represent an effective hazard and are therefore indicated as obstacles (in fact the driver may not have seen the bend because of the fog). Likewise, in the event of normal overtaking, the method avoids generating false alarms due to the presence of the crash barrier while the manoeuvre is in progress. Reconstruction of the road geometry (stages 39 and 44) makes it possible to provide a correct forecast, and therefore to avoid a false alarm, even in the situation of a double bend shown in FIG. 1, with two vehicles 1 and 5 facing each other without this being represented as a hazard.

Another advantage lies in the fact that when evaluating the hazard of an obstacle, the safe distance corresponding to the normal definition, which considers the possibility that the obstacle may stop without warning as a result of an accident, rather than a "relative" safe distance as proposed in some known arrangements, and which also takes into account the braking distance of the vehicle in front and can therefore provide an incorrect evaluation in the abovementioned case of a sudden stop, is taken into consideration.

The fact that the means and methods described have the widest application is also emphasised. In particular their effectiveness does not depend on the existence of a number of equipped vehicles or on the provision of special structures on a road. Also the representation of the road situation in a substantially realistic manner, and not by means of symbols which can only indicate "hazard" situations due to the presence of obstacles closer to or further away from the vehicle, enables the driver to make a full evaluation of the situation so that he can then choose the most appropriate behaviour on the basis of the position of the obstacle in the context of the environment and in particular with respect to the edges of the road and other possible vehicles in order to evaluate, for example, whether the situation is such that a slight manoeuvre to put the vehicle on a path which does not intercept the obstacle (i.e. to steer clear of the obstacle) will be sufficient, or whether more decisive manoeuvres are required, such as sharper braking and a rapid change of course.

Also representation of the road situation in a more normal manner in general makes it possible to obtain shorter reaction times from the driver, even if the latter has a reduced level of concentration and sources of distraction are present.

Reconstruction of the vehicle's path on the basis of increasing orders of approximation provides acceptable forecasts even where the starting data are in themselves insufficient for a reconstruction of the road, or where the manoeuvre being performed by the driver is not understood. In fact, in general, if the vehicle is travelling on a motorway, the higher speed requires that obstacles should be indicated while they are still at a distance. In this case the environment is generally structured, in that the existence of the crash barrier makes it possible to recognise the road and therefore to extrapolate the vehicle's path correctly for some distance. If instead the vehicle is travelling on an unstructured road, information on the edge of the road may be absent; in this case however the speeds in question are normally lesser, and therefore obstacles can be indicated at shorter distances. In this case extrapolation on the basis of the angle of the steering wheel alone has been shown to be sufficient.

Also, the type of representation used, which presupposes an interpretation of the situation, so as to provide only and all information required and to display significant objects on the radar map on the basis of their evaluated hazard level is particularly useful in helping the driver to make a correct evaluation of a situation. In this respect it is advantageous to have a representation, as described with reference to FIG. 7, in which objects which are off the road, which would confuse the scene, making it less comprehensible at a glance, are not shown, in which objects on the road are illustrated in a compact way, so as to represent possible obstacles which lie in the vehicle's path, in which the dimensions of the obstacles increase with their closeness to the vehicle (on the basis of the laws of perspective), in which increasing emphasis is provided with increasing hazard, and in which different alarm levels, with different colours for the obstacles and acoustic warnings, which further aid the driver's understanding of the situation, are provided, thus also providing a certain level of redundancy, which is desirable in the application considered.

Finally it is clear that modifications and variants may be made to the anticollision means and method described and illustrated here without thereby going beyond the scope of the protection of this invention.

In particular, although the use of radar equipment for preparing the map of the environment in front of the vehicle is the most advantageous for the reasons explained above, it is also conceivable that sensors of a different type, such as for example laser beams, may be used for such an application. Detection of the radius of curvature set by the steering wheel may be effected in various ways, either by direct determination of the angle of the steering wheel, as provided for in the example embodiment described above, or by means of an accelerometer or by other means. Similarly the condition (wet or dry) of the road may be detected by means of suitable type adhesion sensors, or may be keyed in directly by the driver by means of an appropriate key. As regards the type of display used for the perspective representation of the road situation, various arrangements may be provided, for example a "head-up display", similar to that used in aircraft, may be provided instead of a liquid crystal screen. Also the type of perspective display may be partly modified in respect of for example the transformation relationships, the outer profile of objects, the representation of the edges of the road and the height of objects.

In addition to this the method according to the invention permits a number of variants with respect to the embodiment described with reference to FIG. 3. In particular all the data received by the sensors may be subjected to different and/or further types of filtering and processing in order to eliminate undesirable disturbances. For example the various distance measurements made on successive maps may be filtered by means of an alpha-beta filter which requires two observations in order to determine the relative speed of the vehicle (in which the filter is initialized for the distance of the obstacle by the first measurement and the relative velocity of the obstacle is estimated from the second measurement). In this case a 3 Hz radar scanner is sufficient for the purpose of describing the road geometry and understanding the manoeuvre in progress, although other higher frequencies may also be used.

In addition to this, although in the embodiment described it is provided that the value of $C_1$ (the spatial derivative of the presumed path curvature) is determined only on the basis of the conditions specified in blocks 41, 44 or 45, in accordance with a preferred variant, the value of $C_1$ may be selected so as to take into account the level of approximation with which the road geometry is reconstructed. In essence, the value F of the function (calculated in block 40) may be used to modify the value of $C_1$ in such a way that this also depends on the value of F.

We claim:

1. In a method for avoiding collision between a human driven motor vehicle and at least one obstacle comprising the stages of: searching for at least one obstacle (120) in an environment in front of the motor vehicle (100) along a presumed path (119) for the motor vehicle, calculating the distance ($d_{obst}$) and the relative speed ($V_{obst}$) of the obstacle, and indicating the obstacle with an indication of its hazard level, these stages being repeated cyclicly, the improvement in that the stage of searching for the obstacle comprises:

generating a map (115) of the environment in front of the motor vehicle (100) by scanning the environment;

reconstructing the geometry of a road (116) on the basis of the map (115);

reconstructing the presumed path (119) of the motor vehicle on the basis of the reconstructed geometry of the road; and searching for the obstacle (120) within the reconstructed presumed path.

2. A method according to claim 1, characterised in that it also includes the stages of detecting the manoeuvre being performed by the motor vehicle (100) with respect to the road (116), and of amending the presumed path (119) of the motor vehicle on the basis of the manoeuvre detected.

3. A method according to claim 1, characterised in that the said scanning is performed by means of a microwave radar.

4. A method according to claim 1, characterised in that the said stage of generating a map (115) comprises scanning of the environment in front of the motor vehicle (100) within a predetermined scanning angle centred on the longitudinal axis of the vehicle (100), with subdivision of the environment in front of the vehicle into a plurality of sectors, and storing a matrix which includes the findings calculated on the basis of the corresponding sector and the distance found.

5. A method according to claim 1, characterised in that it includes the stages of measuring the angle ($\theta$) of the steering wheel of the motor vehicle (100), measuring the speed (v) of the vehicle and determining the condition, wet or dry, of the road surface.

6. A method according to claim 5, characterised in that the radius ($R_V$) and the curvature ($C_{0V}=1/R_V$) of the path travelled by the vehicle (100) at that instant is calculated on the basis of the said steering wheel angle ($\theta$) and the safe distance (dds) of the motor vehicle is calculated on the basis of the formula:

$$dds = v^*Tr + v^2/(2^*A_{max})$$

where Tr is a fixed value and $A_{max}$ represents the maximum deceleration by sharp braking and is stored in the memory as a function of the speed of the vehicle and the road condition.

7. A method according to claim 1, characterised in that the said stage of reconstructing the road geometry includes calculation of the following parameters: the heading angle ($\Phi$) of the motor vehicle (100) and its distance from the edges of the road ($L_s$, $L_d$), and the curvature ($C_{0s}$) and spatial derivative ($C_{1s}$) of the road curvature (116).

8. A method according to claim 7, characterised in that values of the said parameters ($\Phi$, $L_s$, $L_d$, $C_{0s}$ and $C_{1s}$) which maximise the value F in the function $$F = i \frac{1}{1 + a^* d^2(\phi, L_s, L_d, C_{0s}, C_{1s}, x_i, y_i)}$$

where i = 1 ... n, where n is equal to the number of obstacles found in the map, d is the geometrical distance between an obstacle having the coordinates ($x_i$, $y_i$) and the edge of the road, identified from the abovementioned five parameters, and $\alpha$ is a multiplying coefficient of a predetermined value, are sought.

9. A method according to claim 8, characterised in that the value F of the said function is compared with a reference threshold ($F_0$) and when it is less than the said threshold the curvature ($C_1$) of the presumed path (119) is determined on the basis of the angle ($\theta$) of the steering wheel, and if this is not the case the manoeuvre being performed by the motor vehicle (100) is determined.

10. A method according to claim 8, characterised in that the said stage of detecting the manoeuvre being performed includes calculation of the manoeuvre necessary to return the motor vehicle (100) to axial alignment with the road (116) at a predetermined distance (D).

11. A method according to claim 10, characterised in that calculation of the necessary manoeuvre includes calculation of the alignment manoeuvre ($C_{1a}$) in accordance with the relationship:

$$C_{1a} = C_{1V} = C_{1s} + 2^*(C_{0s} - C_{0V})/D - 2^*\Phi/D^2$$

where $C_{1V}$ represents the derivative of the spatial curvature of the path (119) of the motor vehicle (100), $C_{1s}$ is the derivative of the spatial curvature of the road, $C_{0s}$ is the spatial curvature of the road, $C_{0V}$ is the spatial curvature of the vehicle's path, Φ is the heading angle and D represents the said predetermined distance.

12. A method according to claim 11, characterised in that the calculated value of the aligning manoeuvre ($C_{1a}$) is compared with a limit value ($C_{1amax}$) to determine whether the motor vehicle (100) is performing a manoeuvre aligning it with the road profile (119) or is performing a special manoeuvre.

13. A method according to claim 12, characterised in that when the value of the aligning manoeuvre ($C_{1a}$) lies below the said limit value ($C_{1amax}$) the spatial derivative ($C_1$) of the curvature of the presumed path (119) is determined on the basis of the said value of the aligning manoeuvre ($C_{1a}$), otherwise the spatial derivative ($C_1$) of the curvature of the presumed path (119) is calculated on the basis of the special manoeuvre being performed on the basis of the equation:

$$C_1 = \frac{C_{0V}(t) - C_{0V}(t-1)}{v*t}$$

where $C_{0V}(t)$ and $C_{0V}(t-1)$ are the curvature of the vehicle's path (100) at the instants when the present map (115) and the previous map respectively was determined, v is the speed of the motor vehicle (100) and t is the time between two successive detection cycles.

14. A method according to claim 1, characterised in that the said stage of searching for possible objects within the presumed path includes searching for obstacles (120) within a travel corridor (119) having a width equal to the width of the motor vehicle, a curvature equal to $C_{0s}$ and a derivative of the curvature equal to $C_1$.

15. A method according to claim 14, characterised in that when the said stage of searching for obstacles (120) has a negative outcome a representation of the map (115) of the road situation is displayed.

16. A method according to claim 14, characterised in that when the said stage of searching for obstacles (120) has a positive outcome the identification of an obstacle (120) in the previous map (115) is verified.

17. A method according to claim 16, characterised in that when no obstacle is identified in the previous map (115) a representation of the map (115) of the road situation is displayed, and if this is not the case the relative speed ($V_{obst}$) of the obstacle found is calculated, the distance ($d_{obst}$) of the obstacle is compared with the safe distance (dds), when the relative speed ($V_{obst}$) of the obstacle is negative and the distance to the obstacle (dds) is less than the safe distance a serious alarm condition is generated, when the relative speed of the obstacle is positive and the distance to the obstacle is less than the safe distance an alarm condition is generated, and when the relative speed is negative and the distance to the obstacle is greater than the safe distance a prealarm condition is generated.

18. A method according to claim 1, characterised by the generation of a perspective representation of the map (115) of the environment in front of the motor vehicle showing the edges (124) of the road (116), the presumed path (119) of the motor vehicle (100) and objects (125, 126) located on the road, with a different identification according to hazard level.

19. In a system for avoiding collision between a human driven motor vehicle and at least one object, the system including a sensor (22) for monitoring an environment in front of the motor vehicle (100) to detect the presence of the object, means (47, 49) for calculating the distance ($d_{obst}$) and the relative speed ($V_{obst}$) of the object, and means (32, 34) for indicating the presence of the object with an indication of its hazard level, the improvement in that the sensor (22) is a scanning sensor for generating a map (115) of the environment in front of the motor vehicle (100) comprising means (39) for reconstructing the geometry of a road (116) on the basis of the map, means (15) for reconstructing a presumed path (119) for the motor vehicle on the basis of the reconstructed geometry of the road, and means (46) for searching for the object within the presumed path.

20. A system according to claim 19, characterised in that the said sensor (22) is a microwave radar.

21. A system according to claim 19, characterised in that it includes means (43) for detecting the manoeuvre being performed by the motor vehicle (100) with respect to the road (116) and means (45) for altering the presumed path (119) of the motor vehicle (100) on the basis of the manoeuvre found.

22. A system according to claim 19, characterised in that it includes means (17) for counting the positive findings obtained for a given distance within a plurality of sectors of predetermined angular size constituting the map (115) and means (18) for storing a matrix recording the number of findings calculated in relation to the corresponding sector and the distance found.

* * * * *

UNITED STATES PATENT AND TRADEMARK OFFICE
CERTIFICATE OF CORRECTION

PATENT NO. : 5,643,206
DATED : July 1, 1997
INVENTOR(S) : Dan E. Fischer

It is certified that error appears in the above-identified patent and that said Letters Patent is hereby corrected as shown below:

Cover Page, Abstract, line 5, change "preferable" to --preferably--

Col. 1, line 26, "luring" should be --luting--

Col. 7, line 19, change "assembly 10" --assembly 10a--

Col. 7, line 24, change "a in" to --in a--

Col. 7, line 39, change "tip 226" to --tip 26--

Col. 14, line 5, change "of the at" to --of at--

Signed and Sealed this

Ninth Day of June, 1998

Attest:

BRUCE LEHMAN

*Attesting Officer*   *Commissioner of Patents and Trademarks*